United States Patent [19]

Tanaka et al.

[11] Patent Number: 5,287,357
[45] Date of Patent: Feb. 15, 1994

[54] COMMUNICATION CONTROL DEVICE HAVING A APPARATUS FOR DETECTING THE ABSENCE OF A CONTROL DATA ON A RING COMMUNICATION NETWORK

[75] Inventors: Koichi Tanaka, Kawasaki; Akira Kanuma; Katsuhito Fujimoto, both of Yokohama, all of Japan

[73] Assignee: Kabushiki Kaisha Toshiba, Kawasaki, Japan

[21] Appl. No.: 751,109

[22] Filed: Aug. 28, 1991

[30] Foreign Application Priority Data

Aug. 29, 1990 [JP] Japan ................... 2-225407

[51] Int. Cl.$^5$ ....................... H04J 3/16; H04L 12/42
[52] U.S. Cl. ................... 370/85.5; 340/825.05
[58] Field of Search ............ 370/85.5, 85.4, 85.15, 370/85.2, 85.1, 85.11, 85.12, 85.6, 13; 340/825.05, 825.5, 925.51; 371/29.1, 29.5

[56] References Cited

U.S. PATENT DOCUMENTS

| | | | |
|---|---|---|---|
| 4,494,233 | 1/1985 | Bahr et al. | 370/85.5 |
| 4,507,777 | 3/1985 | Tucker et al. | 370/16 |
| 4,566,098 | 1/1986 | Gammage et al. | 370/85.5 |
| 4,745,598 | 5/1988 | Ulug | 370/85.5 |
| 4,813,039 | 3/1989 | Yoshihiro | 370/85.5 |
| 4,860,284 | 8/1989 | Brown et al. | 370/85.5 |
| 4,930,121 | 5/1990 | Shiobara | 370/85.4 |
| 4,998,246 | 3/1991 | Tanaka | 370/85.5 |
| 5,048,014 | 9/1991 | Fischer | 370/85.5 |
| 5,051,986 | 9/1991 | Grow et al. | 370/85.5 |
| 5,068,849 | 11/1991 | Tanaka | 370/85.5 |
| 5,093,828 | 3/1992 | Braun et al. | 370/85.5 |
| 5,119,374 | 6/1992 | Firoozmand et al. | 370/85.6 |
| 5,191,580 | 3/1993 | Nakano et al. | 370/85.4 |

OTHER PUBLICATIONS

Token Ring Network Architecture Reference (3rd Edition). Appendix A. *Token–Protocol Timers*, International Business Mach Corp. (1989).

IEEE Std. 8025-1989 Token Ring Access Method and Physical Layer Specifications, Chap. 3, Sec. 4 *Timers*, IEEE (1989).

*Primary Examiner*—Wellington Chin
*Assistant Examiner*—Dang Ton
*Attorney, Agent, or Firm*—Oblon, Spivak, McClelland, Maier & Neustadt

[57] ABSTRACT

A communication control device receives and transmits control data and/or communication data through a ring communication network. The apparatus comprises a wait time decision unit for deciding, according to a state of the network, a wait time for detecting a reception of the control data circulating through the network; a wait time holding unit for holding the wait time decided by the wait time decision unit; and a time counting unit for counting time from a reception of the control data and providing a broken control data report signal if the control data is not again received within the wait time.

18 Claims, 7 Drawing Sheets

COMMUNICATION CONTROL DEVICE HAVING A APPARATUS FOR DETECTING THE ABSENCE OF A CONTROL DATA ON A RING COMMUNICATION NETWORK

BACKGROUND OF THE INVENTION

1. Field of the Invention

The present invention relates to a communication control apparatus for detecting the absence of a control data circulating through a ring communication network, and particularly to a communication control device that can shorten a wait time for issuing a broken control data report signal which indicates the absence of a control data and to quickly carry out a control data recovery process.

2. Description of the Prior Art

A token ring network is a kind of a local area network (LAN) communication system. The token ring network connects a plurality of communication control devices (nodes) in a ring as defined in IEEE Std. 802.5, and circulates a frame having communication data and a control data called a token, which is control a communication of the frame, as a bit stream through the communication control devices in the network.

FIG. 1 shows a block diagram related to a token management function in the communication control devices connected to the token ring network. The communication control device 101 comprises a reception unit 103 for receiving a bit stream from an upstream one of the communication control devices and detecting the token in the data bits; a transmission unit 104 for receiving the communication data from the reception unit 103 and transmitting the same to a downstream one of the communication devices; a timer unit 105 for starting a time counting operation in response to a token detection signal provided by the reception unit 103 and providing a broken token report signal (a time out report signal) if not receiving the next token detection signal within a predetermined time; and a protocol control unit 107 for providing a token transmission signal to the transmission unit 104 when receiving no broken token report signal from the timer unit 105.

Upon receiving the token transmission signal from the protocol control unit 107, the transmission unit 104 generates and transmits the token. The timer unit 105 detects whether or not the token is broken due to noise, etc.

FIG. 2 shows a format of the token.

FIG. 3 is a block diagram showing a conventional timer unit to be disposed in the communication control device of FIG. 1.

In FIG. 3, the timer unit comprises a good token timer 121, which is restarted to count in response to a restart signal, i.e., the token detection signal provided by the reception unit 103 when an enable signal is supplied from the protocol control unit 107. If the good token timer 121 does not receive the next token detection signal from the reception unit 103 within the fixed wait time, the good token timer 121 provides a time out signal, i.e., the broken token report signal and stops counting. If the good token timer 121 receives the next token detection signal from the reception unit 103 within the fixed wait time, the good token timer 121 is restarted as described above.

With the good token timer 121 installed in the timer unit of each communication control device, the number of the communication control devices (nodes) to be connected to the token ring network may be 260 at a maximum. A token holding time of each node is 10 milliseconds (ms), so that if there are 260 nodes, it takes 2.6 sec (10 ms×260) at maximum for a token to circulate through the network. Accordingly, the good token timer 121 is usually designed to have the maximum value of 2.6 sec as a fixed wait time.

Namely, if the token is not again detected 2.6 sec after detecting the token for the first time, the good token timer 121 provides the broken token report signal indicating that the token was broken by noise, etc., and that a recovery process such as sending again the token must be carried out.

FIG. 4 shows a token ring network 125 including four nodes (communication control devices) A to D each having the good token timer 121 of FIG. 3. This network circulates a token in a counterclockwise direction.

In each of the nodes A to D, the good token timer 121 is restarted to count the fixed wait time of 2.6 sec whenever receiving the token. If the good token timer 121 of a certain one of the nodes A to D again receives the token within the fixed wait time, the normal data communication is carried out.

If the circulating token is broken due to noise, etc., between, for example, the nodes A and B, the good token timer 123 of the node B causes a time out at first because the timer 123 of the node B has been started earliest. The node B, therefore, provides the broken token report signal.

As explained before, a maximum token holding time of each node for holding a token for transmitting communication data is 10 ms. In the token ring network 125 with the four nodes A to D of FIG. 5, a maximum time for circulating the token through the network 125 is 40 ms (10 ms×4 nodes), so that the 40 ms is sufficient as the wait time set in the good token timer 121.

The wait time of the good token timer 121, however, is fixed to 2.6 sec in consideration of the maximum node number of 260 possibly connected to the token ring network. As a result, although the 40 ms is sufficient as the wait time for determining whether or not the token is broken in the small token ring network with the four nodes shown in FIG. 5, each node of the network of FIG. 5 must have a redundancy of 2.56 sec (2.6 sec −40 ms). For this redundancy, the broken token report signal is delayed, and data transmission is disabled. This means that, if the token ring has a data transfer rate of 4 Mbps, data of about 10 megabits are not transmitted during the redundancy of 2.56 sec, to cause a lowering of communication efficiency.

When no data is transmitted from any one of the four nodes, the token is circulated at high speed through the network 125 because the token is not kept in each node. In this case, the broken token report signal will never be provided by any one of the nodes before the expiration of the fixed wait time of 2.6 sec, and during this period, no communication will be made, thereby aggravating the problem.

SUMMARY OF THE INVENTION

An object of the present invention is to provide a communication control device that changes a wait time of a good token timer depending on the condition of a network mainly on the number of communication control devices, thereby shortening a time for issuing a broken token report signal and quickly carrying out a broken token restoration process.

In order to accomplish the object, the invention provides a communication control device connected to a ring communication network, comprising wait time decision means for deciding, depending on the number of communication control devices, a wait time for receiving a next token circulating through the network; wait time holding means for holding the wait time decided by the wait time decision means; and time counting means for counting time upon receiving the token and providing an abnormal signal if not again receiving the token within the wait time held in the wait time holding means.

The wait time decision means may receive a node present frame from each of the communication control devices connected to the network, calculate the number of the communication control devices operating on the network according to the node present frame, and compute a minimum wait time for the network according to the calculated number of the communication control devices.

The wait time decision means is constructed to calculate the number of the communication control devices operating on the network by counting up the number of second frames received during a period from a reception of the first frame to the next reception of the first frame, and to detect a disappearance of the control data according to the calculated number of the communication control devices, and restore the control data.

The wait time decision means may have input means for optionally entering the number of nodes (communication control devices) connected to the network; and wait time calculation means for calculating a minimum wait time for the network according to the number of nodes entered through the input means.

The wait time decision means may have first wait time calculation means for receiving a node present frame from each of the nodes (communication control devices) connected to the network, calculating the number of the nodes connected to the network according to the node present frame, and computing a wait time according to the calculated number of the nodes; input means for optionally entering the number of the nodes; second wait time calculation means for computing a wait time according to the number of nodes entered through the input means; and a wait time comparison means for comparing the wait time calculated by the first wait time calculation means with the wait time calculated by the second wait time calculation means and selecting a longer one of them as a minimum wait time for the network.

In this way, the present invention calculates the number of the nodes (the communication control devices) operating on the network according to the node present frame transmitted from the nodes, computes the minimum wait time for the network according to the calculated number of the operating nodes, and writes the minimum wait time in the wait time holding means. Upon receiving the control data circulating through the communication network, the time counting means reads the wait time held in the wait timeholding means and starts to count time. If the control data is not again received within the wait time, the time counting means provides a broken control data report signal to indicate that the token is absent.

The number of the nodes may be optionally entered into the wait time calculation means through the input means. The wait time calculation means calculates a minimum wait time for the network according to the entered number of the nodes and writes the calculated wait time in the wait time holding means. Upon receiving the control data, the time counting means starts to count time, and if the control data is not again received within the wait time, provides the broken control data report signal.

The wait time calculation means may compare the wait time calculated according to the number of nodes derived from the node present frame with the wait time calculated according to the number of nodes entered through the input means, and select a longer one of them. The selected wait time is written as a required minimum wait time for the network into the wait time holding means. Upon receiving the control data (token), the time counting means reads the wait time from the wait time holding means, and starts counting time. If the token is not received again within the wait time, the time counting means provides the broken token report signal.

These and other objects, features and advantages of the present invention will be more apparent from the following detailed description of preferred embodiments in conjunction with the accompanying drawings.

DETAILED DESCRIPTION OF THE EMBODIMENTS

Figure 1:
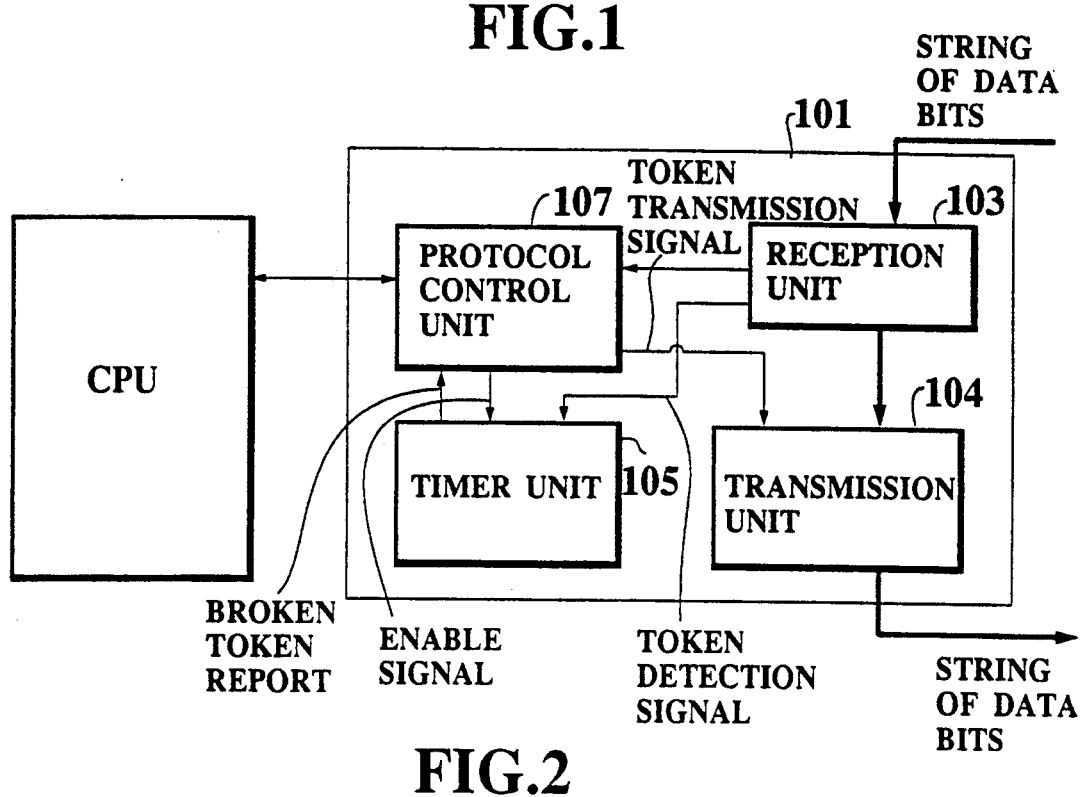
FIG. 1 is a block diagram schematically showing a standard communication control device.
Figure 2:
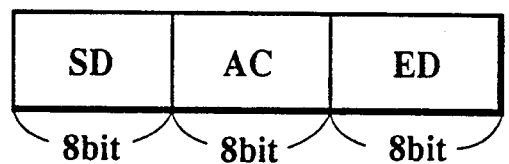
FIG. 2 is a view showing a format of control data (a token)
Figure 3:
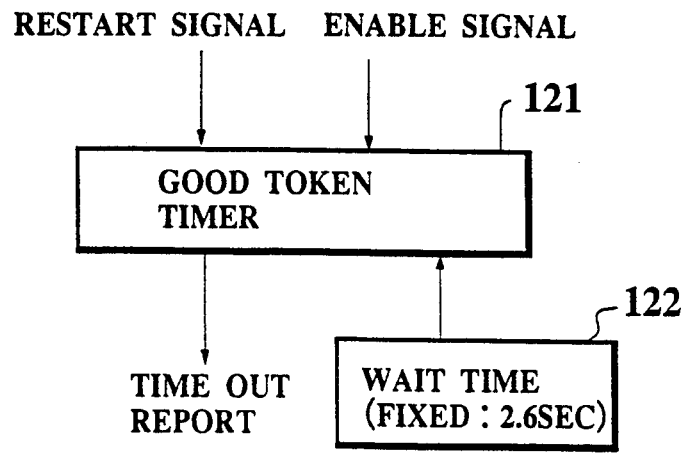
FIG. 3 is a block diagram showing a conventional timer unit used for the communication control device of FIG. 1.
Figure 4:
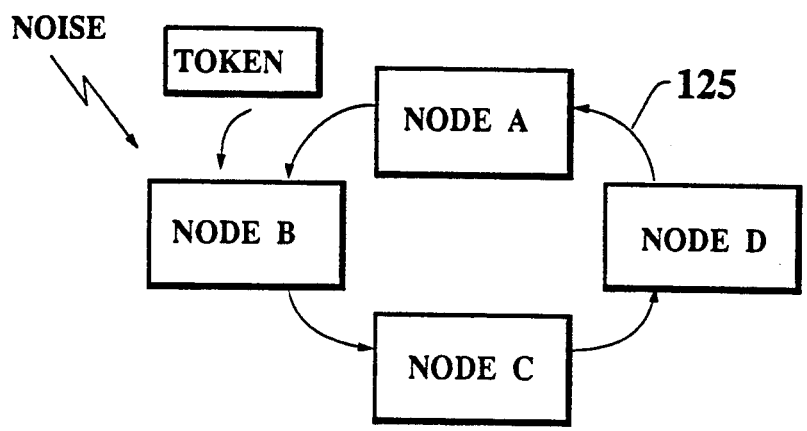
FIG. 4 is a view showing a token ring network for explaining a prior art.
Figure 5:
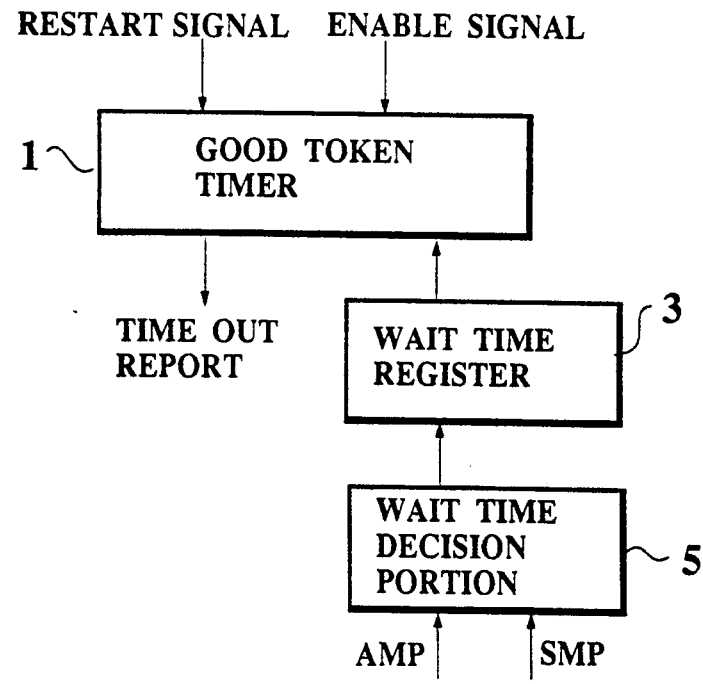
FIG. 5 is a block diagram schematically showing a timer unit according to the present invention for a communication control device.

FIG. 5 is a block diagram schematically showing an embodiment of a timer unit according to the present invention, used for the communication control device of FIG. 1 connected to a token ring network. The other parts of the device except the timer unit are the same as those explained with reference to FIG. 1, and therefore, their explanations will not be repeated.

In FIG. 5, the timer unit according to the invention comprises a good token timer 1, a wait time register 3, and a wait time decision portion 5.

Upon receiving a restart signal, the good token timer 1 reads a wait time written in the wait time register 3, and starts counting time. If the wait time elapses during the counting, the good token timer 1 provides a time out report signal and stops counting.

The wait time register 3 holds the wait time calculated in the wait time decision portion 5, and provides the wait time for the good token timer 1.

The wait time decision portion 5 calculates the wait time according to the number of nodes (communication control devices) connected to and operating on the token ring network, and writes a result of the calculation into the wait time register 3.

In this way, the wait time decision portion 5 of the timer unit for the communication control device according to the invention calculates and changes the wait time according to the condition of the network. The wait time thus calculated is written in the wait time register 3. Upon receiving a restart signal, the good token timer 1 reads the wait time from the wait time register 3 and starts counting time. If the wait time elapses during the counting, the good token timer 1 provides the time out report signal.

Next, embodiments of a timer unit will be explained.

Figure 6:
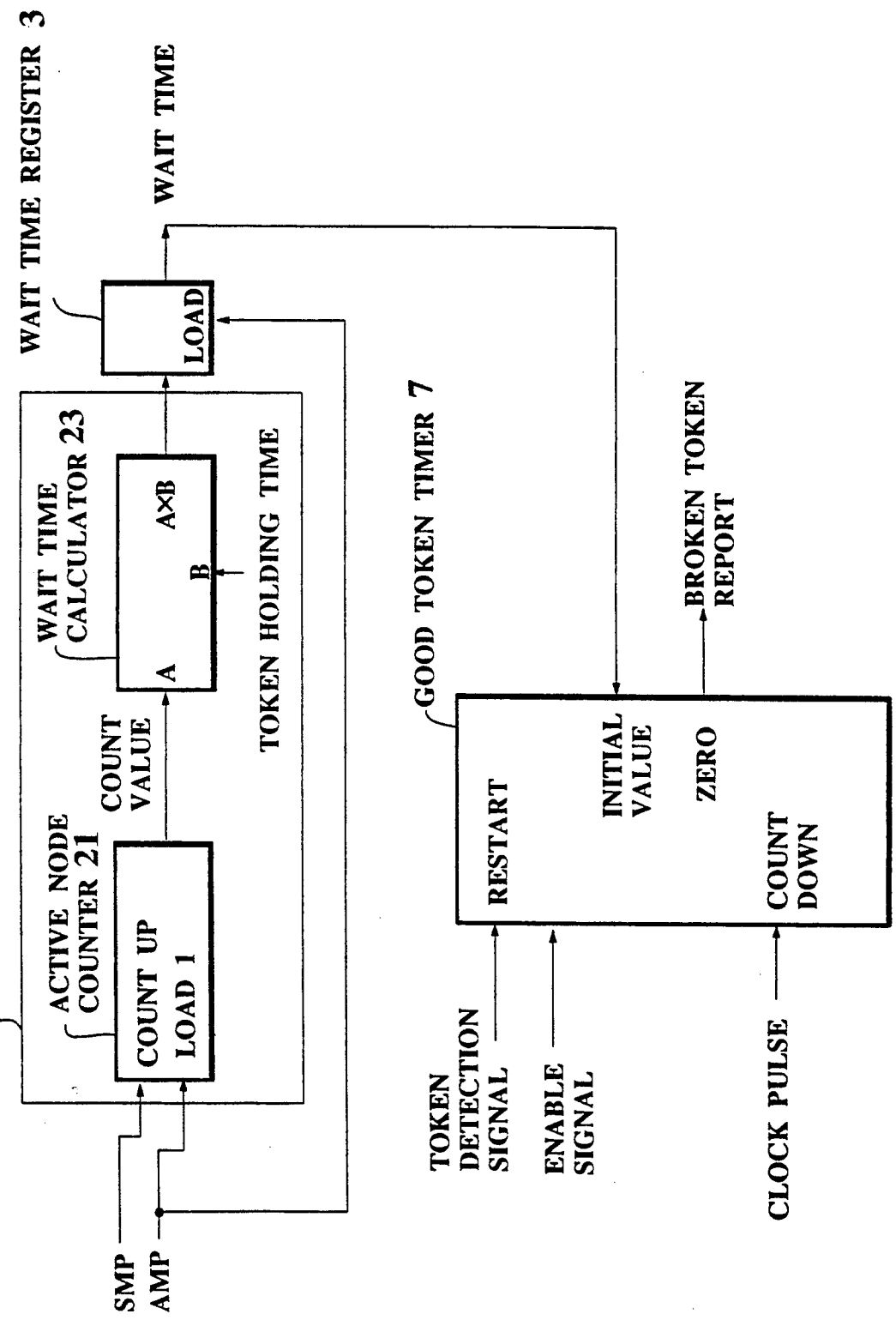
FIG. 6 is a block diagram showing a timer unit according to a first embodiment of the invention for a communication control device.

FIG. 6 is a block diagram showing a timer unit using a good token timer according to the embodiment of the invention, used for the communication control device connected to the token ring network.

When receiving a token detection signal and an enable signal, the good token timer 7 reads a wait time value from a wait time register 3 and then restarts. While the token detection signal is not being received, the good token timer 7 decreases the wait time value according to a clock pulse, and when the wait time value is zeroed, provides a broken token report signal.

Figure 7:
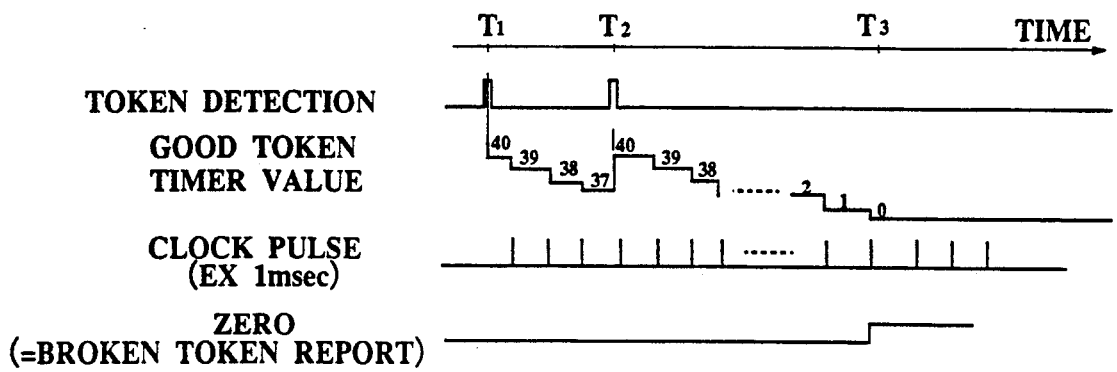
FIG. 7 is a time chart showing an operation of a good token timer of the embodiment of FIG. 6.

FIG. 7 shows an operation of the good token timer 7. In this figure, the wait time value is set to 40 ms, and the clock pulse is provided every one millisecond. Upon receiving a first token detection signal in the figure, the good token timer 7 reads the wait time value of 40 ms from the wait time register 3 at a time $T_1$. The good token timer 7 decreases the wait time value, and when detecting a second token detection signal before the wait time value is zeroed, restarts counting 40 ms at a time $T_2$. Since no token is detected after the second token detection signal in FIG. 7, the wait time value is zeroed at a time $T_3$, and the good token timer 7 provides the broken token report signal. The wait time value is not decreased less than zero.

Referring again to FIG. 6, a wait time calculation portion 5 receives an AMP (active monitor present frame) and an SMP (standby monitor present frame), and according to these two events, calculates and decides the wait time. This will be explained in more detail.

Figure 8:
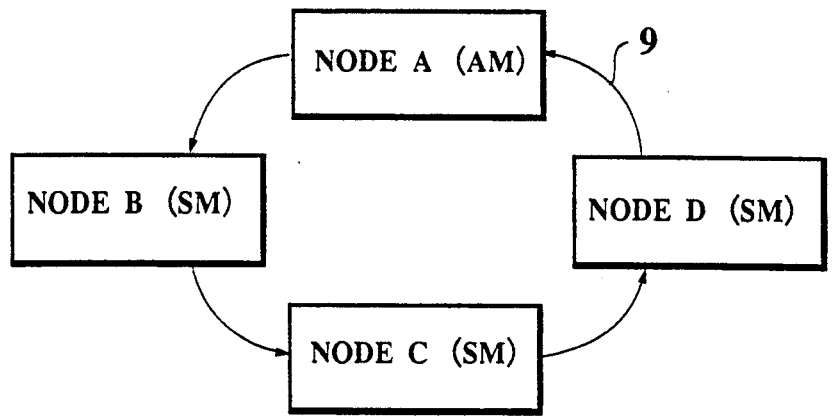
FIG. 8 is a view showing a token ring network employing the embodiment of FIG. 6.

FIG. 8 shows a token ring network 9 including four nodes (communication control devices) A to D, in which the node A is an active monitor (AM) node and the nodes B to D are standby monitor (SM) nodes each having the good token timer 7. The token ring network 9 carries out a neighbor notification every seven seconds.

Figure 9:
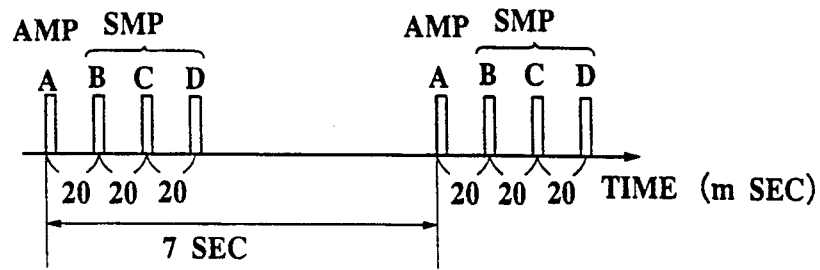
FIG. 9 is a view explaining a neighbor notification operation in the token ring network of FIG. 8.

The neighbor notification will be explained with reference to a timing chart of FIG. 9.

The neighbor notification is started by sending the control frame AMP from the active monitor (AM) node A. The AM node A repeatedly transmits the control frame AMP every seven seconds. Twenty milliseconds after receiving the control frame AMP from AM node A, the standby monitor (SM) node B on the downstream side of the AM node A sends the control frame SMP to the next downstream SM node C. Similarly, twenty milliseconds after receiving the control frame SMP from the upstream SM node, each of the other SM nodes C and D sends the control frame SMP to the downstream SM node. As is apparent in FIG. 9, the number of the SMP reception events between one AMP reception event and the next AMP reception event plus one is equal to the number of the nodes existing and operating in the token ring network 9.

In FIG. 6, the wait time decision portion 5 includes an active node counter 21 and a wait time calculator 23. The wait time decision portion 5 receives each of the AMP and SMP events, and the active node counter 21 is set to "1" in response to the AMP reception event and increased by one in response to each SMP reception event.

The count value of the active node counter 21 is provided to the wait time calculator 323, which multiplies the same by a token holding time and provides the result as a wait time. An initial value of the active node counter 21 is set such that the maximum wait time of 2.6 sec defined according to a protocol is set in the wait time register 3 at first.

In response to the AMP reception event, the wait time register 3 receives the wait time from the wait time calculator 23 and holds the same. The wait time held by the wait time register 3 is given to the good token timer 7 as and when required.

Figure 10:
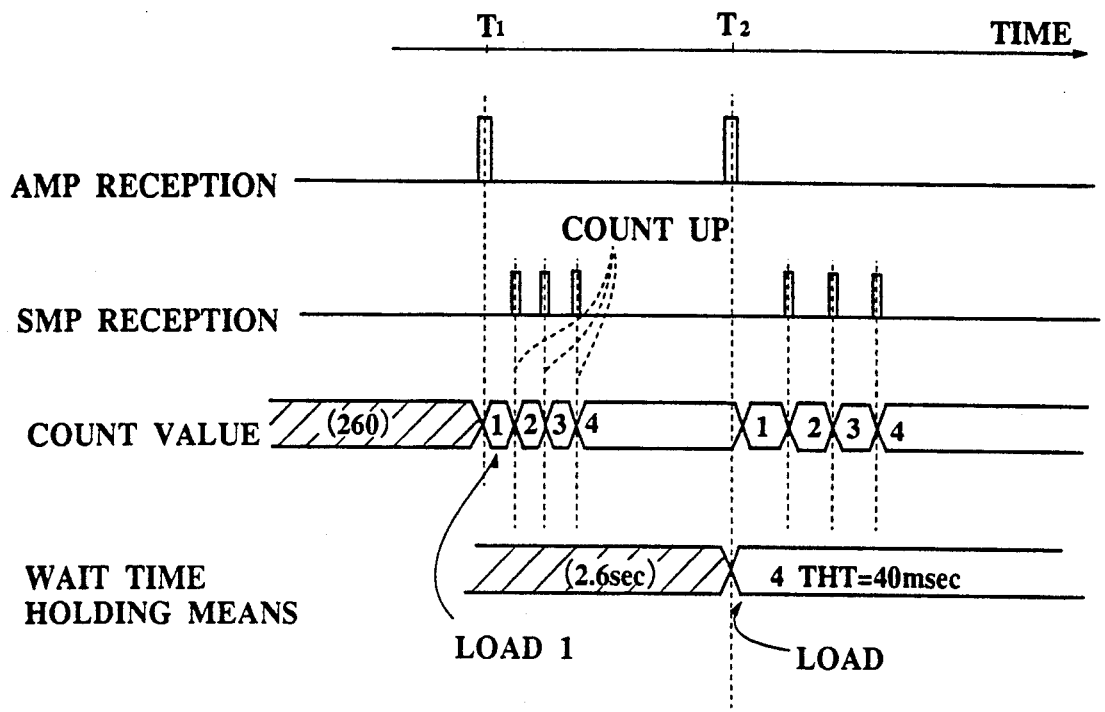
FIG. 10 is a view explaining an operation of the timer unit of FIG. 6 according to signals AMP and SMP.

FIG. 10 shows an operation of the timer unit 5 in response to AMP and SMP reception events. In response to a first AMP reception event, "1" is set in the active node counter 21 at time $T_1$, and in response to the following three SMP reception events, the count value in the active node counter 21 is increased to "4". This count value is equal to the number of the nodes operating in the token ring network 9. The wait time calculator 23 multiplies the count value "4" by a token holding time of, for example, 10 ms and provides 40 ms. This value 40 ms is given to the wait time register 3 in response to the AMP reception event at a time $T_2$.

The good token timer 7 is restarted, and when 40 ms elapses, provides the broken token report signal.

In this way, the number of the operating nodes is found according to the AMP and SMP reception events, and an optimum wait time is calculated according to the number of the operating nodes. Even if the number of the operating nodes is reduced, a wait time suitable for the reduced number is automatically calculated, so that a redundant wait time doesn't occur unlike in the conventional timer unit, and a broken token recovery process is quickly carried out if a broken token is detected. Since the wait time register 3 is updated every seven seconds, the wait time register 3 holds an optimum wait time even if the number of the existing nodes is increased or decreased.

For the token ring network of four nodes, the conventional communication control device holds, as mentioned before, a wait time of 2.6 sec for detecting a broken token. On the other hand, the communication control device of the invention holds a wait time of only 0.04 sec. Namely, the invention can eliminate a wait loss time of 2.56 sec. When the transmission capacity of the network is 4 Mbps, this wait loss time of 2.56 sec corresponds to about 10 megabits of communication data. Namely, the invention saves such an enormous loss of 10 megabits in data transmission.

EMBODIMENT 2

In the embodiment 1, the number of operating nodes is found by the wait time decision portion 5 according to the AMP and SMP reception events. The number of nodes may be found not with the wait time decision portion 5 but directly entered into the wait time decision portion 5 through a user terminal or a control processor. Namely, the number of nodes presently connected to or expected to be connected to a network is directly entered into the wait time decision portion 5 through the user terminal or the control processor, irrespective of whether or not the nodes are operating.

Figure 11:
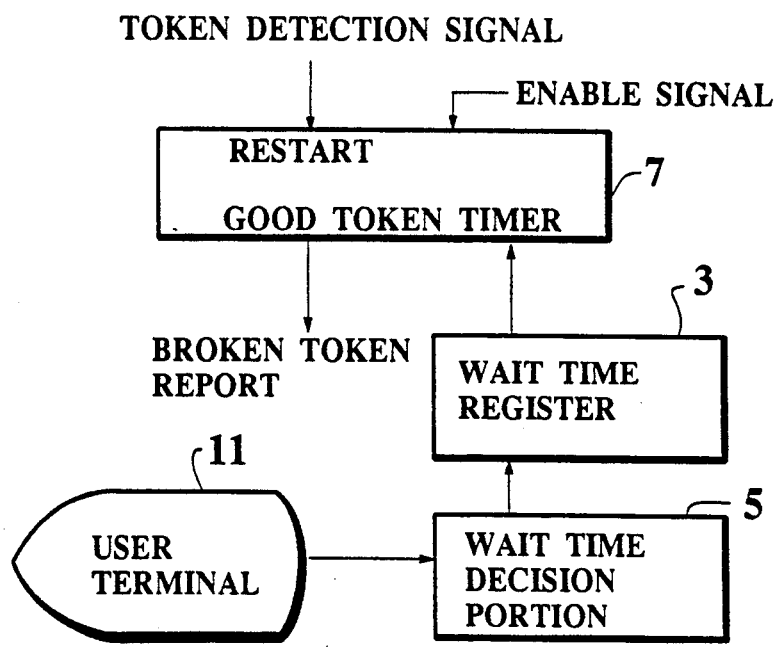
FIG. 11 is a block diagram showing a timer unit according to a second embodiment of the invention for a communication control device.

FIG. 11 is a block diagram showing a timer unit according to the embodiment 2, used for the communication control device. In FIG. 11, the timer unit is provided with a user terminal 11. The user terminal 11 is for entering the number of nodes into the wait time decision portion 5. When the number of nodes is entered through the user terminal 11, the wait time decision portion 5 calculates a wait time for a good token timer 7.

For example, if the number of nodes used by users is always less than 100, a number of 100 is entered as an upper limit number of nodes through the user terminal 11. The wait time decision portion 5 then calculates a wait time of one second (the user entered number of nodes × 10 ms = 100 nodes × 10 ms = 1 sec).

The calculated wait time is written in a wait time register 3. Upon receiving a token detection signal, the good token timer 7 reads the wait time from the wait time register 3. If the wait time of 1 sec elapses, the good token timer 7 provides the broken token report signal.

In this way, an upper limit number of nodes is entered through the user terminal 11, to thereby avoid an unnecessarily long wait time.

EMBODIMENT 3

Figure 12:
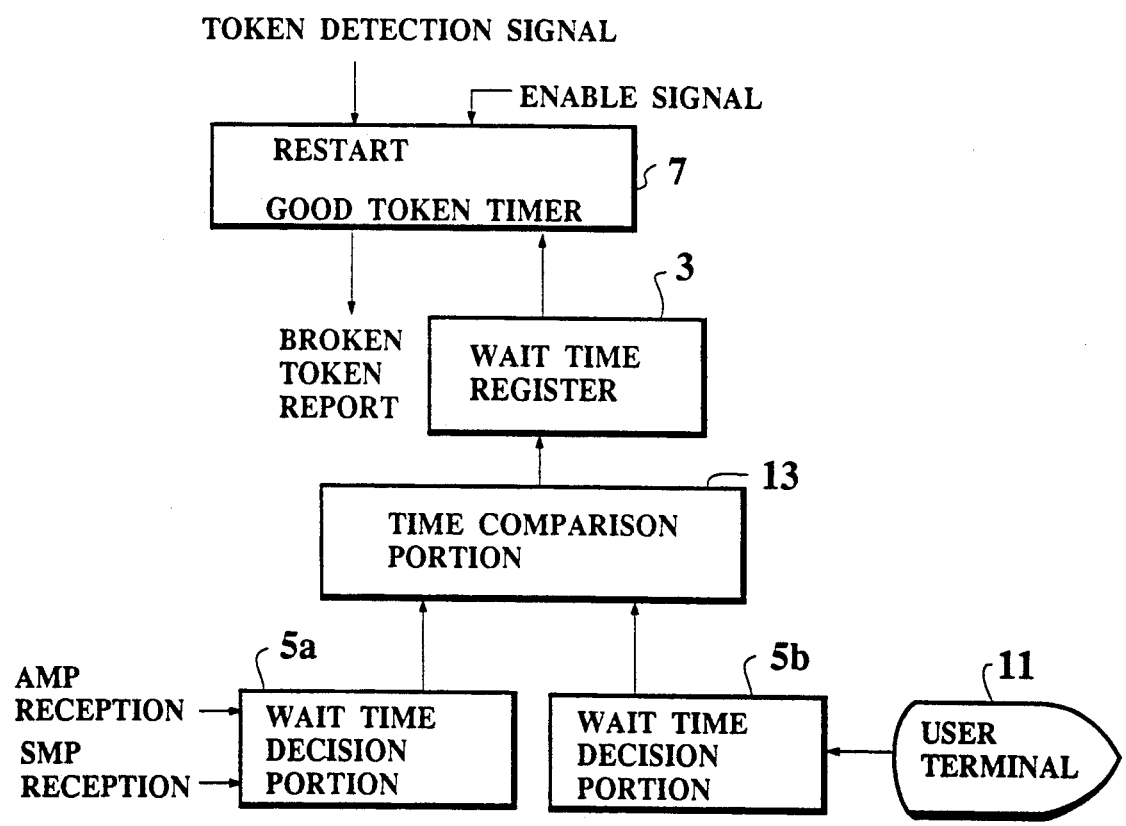
FIG. 12 is a block diagram showing a timer unit according to a third embodiment of the invention for a communication control device.

FIG. 12 is a block diagram showing a timer unit according to the embodiment 3 of the invention, used for the communication control device.

This embodiment 3 is a combination of the embodiments 1 and 2.

The timer unit has two wait time decision portions 5a and 5b, and a time comparison portion 13.

Similar to the wait time decision portion 5 of the embodiment 1, the wait time calculation portion 5a finds the number of operating nodes according to AMP and SMP reception events, and calculates a wait time according to the number found.

Similar to the wait time calculation portion 5 of the embodiment 2, the wait time calculation portion 5b calculates a wait time according to the number of nodes entered through a user terminal 11.

The time comparison portion 13 compares the two pieces of wait time calculated by the wait time decision portions 5a and 5b with each other, selects a longer one of them, and writes the selected one in a wait time register 3.

Namely, the wait time calculated according to the AMP and SMP reception events occurring every seven seconds and the wait time calculated according to the data entered through the user terminal 11 are supplied to the time comparison portion 13, which compares them with each other and selects a longer one of them as a required minimum wait time for the network.

In the embodiment 3, an optimum wait time is calculated according to the AMP and SMP reception events even if the number of actually operating nodes exceeds the number entered through the user terminal 11.

EMBODIMENT 4

In the embodiments explained above, the number of the nodes (communication control devices) in the network is counted in each of the nodes. During a transient period, the numbers counted in the respective nodes may disagree with one another. If the number counted by a certain node is very small, a wait time set in the node is also very small, so that, even if the network is normally operating, the good token timer of the node in question may sometimes provide a time out report signal.

Figure 13:
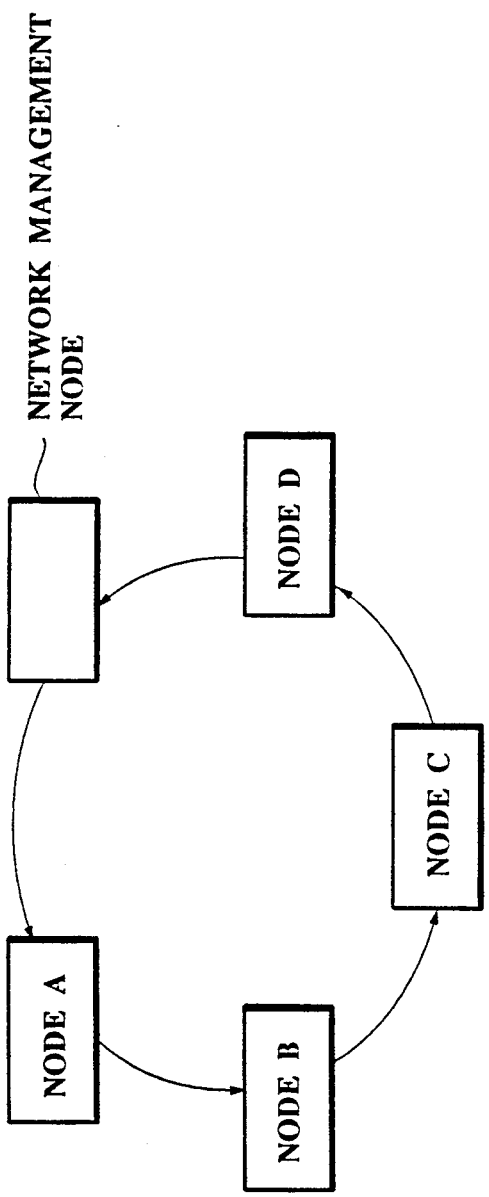
FIG. 13 shows a token ring network employing a fourth embodiment of the invention shown in FIG. 14.

To avoid this kind of inconvenience, a specific node is set as a network management node as shown in FIG. 13, for counting the number of operating nodes in the network. The network management node notifies the number of operating nodes to the other nodes, and each of which immediately calculates a wait time according to the notified number.

Figure 14:
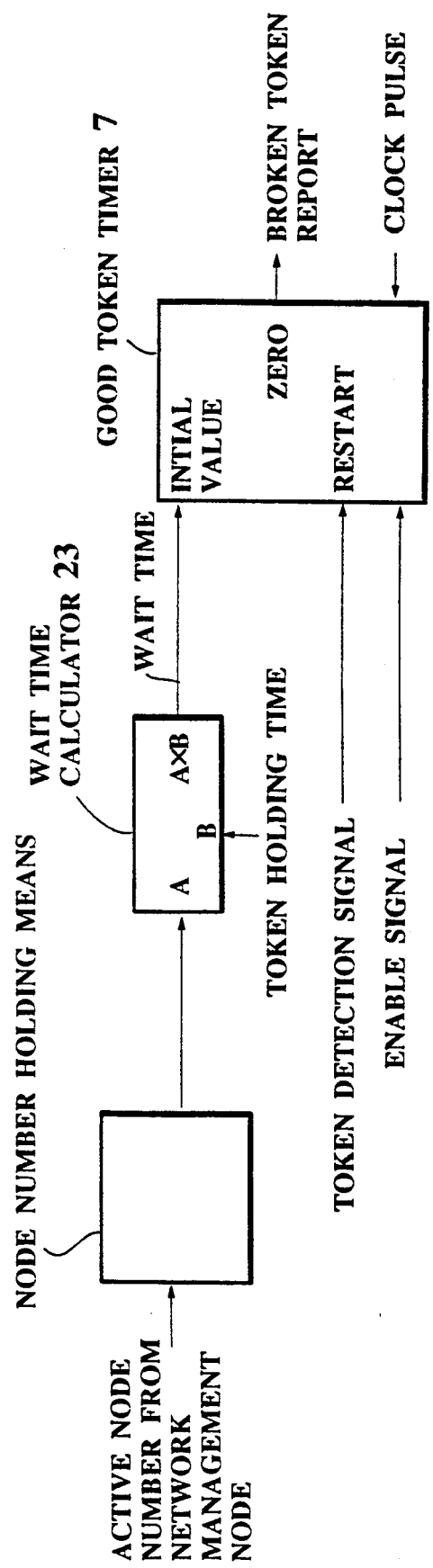
FIG. 14 is a block diagram showing a timer unit according to the fourth embodiment of the invention for a communication control device.

FIG. 14 shows a timer unit disposed in each of the communication control devices (nodes) of this embodiment.

Similar to the third embodiment, the calculated wait time may be compared with a wait time entered through a user terminal, and a longer one of them may be set as a wait time for a good token timer 7.

EMBODIMENT 5

In the embodiments 2 and 3, the number of nodes is entered through the user terminal, and a wait time is calculated according to the entered number of nodes. It is possible to directly enter the wait time through the user terminal.

In the embodiment 4, the number of nodes is notified by the network management node to the other nodes (communication control devices) and each of which calculates a wait time. Instead, the wait time itself may be calculated in the network management node and then notified to the other nodes.

In summary, a communication control device according to the invention for a ring token network changes a wait time of a good token timer depending on the condition of the network and calculates an optimum wait time for the timer, so that a broken token report signal may be provided as quickly as possible from the good token timer, and a control data restoration time may be minimized.

Various modifications will become possible for those skilled in the art after receiving the teachings of the present disclosure without departing from the scope thereof.

What is claimed is:

1. A communication control device for receiving and transmitting control data and/or communication data through a ring communication network to which said communication control device and other communication control devices are connected for communication, comprising:

(a) wait time decision means for deciding, according to the number of communication control devices actually operating in the network, a wait time for detecting disappearance of the control data circulating through the network;

(b) wait time holding means for holding the wait time decided by said wait time decision means; and (c) time counting means for counting time from a reception of the control data and providing a broken control data report signal if the control data is not again received within the wait time held in said wait time holding means.

2. The communication control device according to claim 1, further comprising:

(d) reception means for receiving the control data and/or the communication data through the network and detecting the control data;

(e) transmission means for transmitting the control data and/or the communication data from the reception means and generating a new control data through the network; and (f) protocol control means for providing a control data transmission signal to the transmission means when said time counting means provides the broken control data report signal, the transmission means transmitting the control data when receiving the control data transmission signal from the protocol control means.

3. The communication control device according to claim 1, wherein said wait time decision means receives a node present report frame from each of the other communication control devices operating on the network, calculates the number of the communication control devices operating on the network according to the node present report frames, and computes a minimum wait time for the network according to the calculated number of the communication control devices.

4. The communication control device according to claim 1, wherein said wait time decision means is constructed to calculate a number of the communication control devices operating on the network by counting up a number of second type frames received during a period from a reception of a first type frame to the next reception of the first type frame.

5. The communication control device according to claim 1, wherein said wait time decision means includes:

input means for optionally entering the number of communication control devices; and wait time calculation means for calculating a minimum wait time for the network according to the number of communication control devices entered through the input means.

6. The communication control device according to claim 1, wherein said wait time decision means includes:

a first wait time calculation means for receiving a node present report frame from each of the communication control devices on the network, calculates the number of the communication control devices according to the node present report frames, and computes a wait time according to the number calculated;

input means for optionally entering the number of communication control devices;

a second wait time calculation means for calculating a wait time according to the number of communication cation control devices entered through the input means; and wait time comparison means for comparing the wait time calculated by the first wait time calculation means with the wait time calculated by the second wait time calculation means and selecting a longer one of them as a wait time for the network.

7. A token ring local area network system, comprising:

ring communication means for circulating control data and/or communication data; and a plurality of communication nodes connected to the ring communication means, for receiving and transmitting the control data and/or the communication data, one of said communication nodes transmitting a first frame, and each of the other communication nodes transmitting a second frame, each of said communication nodes counting up the number of the second frame received during a period from a reception of the first frame to the next reception of the first frame, deciding a wait time according to the counted number, detecting disappearance of the control data according to the wait time, and recovering the control data.

8. The token ring local area network system according to claim 7, wherein each of said communication nodes includes:

reception means for receiving the control data and/or the communication data through said ring communication means and detecting the control data;

transmission means for transmitting the communication data from the reception means through said ring communication means;

wait time decision means for deciding a wait time for detecting disappearance of the control data circulating through said ring communication means, according to the number of said communication nodes operating in to said ring communication means;

wait time holding means for holding the wait time decided by the wait time decision means;

wait time counting means for counting time from a reception of the control data and providing a broken control data report signal if the control data is not again received within the wait time held in the wait time holding means; and protocol control means for providing a control data transmission signal to the transmission means when the time counting means does not provide the broken control data report signal, the transmission means transmitting the control data when receiving the control data transmission signal from the protocol control means.

9. A token ring local area network system, comprising:

ring communication means for circulating control data and/or communication data;

a network control node connected to said ring communication means, for controlling the network system; and a plurality of communication nodes connected to the ring communication means, for receiving and transmitting the control data and/or the communication data, each of said communication nodes receiving information indicating the number of nodes actually operating on the network from said network control node and updating a wait time for detecting disappearance of the control data according to the number received.

10. The token ring local area network system according to claim 9, wherein one of said network control node and said communication nodes periodically provides a first signal, and the other nodes periodically provides a second signal, and wherein said network control node counts up the number of the second signals received during the first signal period, calculates the number of nodes, through which data exchange is possible, in the ring according to the second signals counted, and provides the information indicating the number of actually operating nodes.

11. The token ring local area network system according to claim 9, wherein each of said communication nodes includes:

reception means for receiving the control data and/or the communication data through said ring communication means and detecting the control data;

transmission means for transmitting the communication data from the reception means through said ring communication means;

wait time decision means for deciding a wait time for detecting disappearance of the control data circulating through said ring communication means, according to the number of said communication nodes connected to said ring communication means;

wait time holding means for holding the wait time decided by the wait time decision means;

wait time counting means for counting time from a reception of the control data and providing a broken control data report signal if the control data is not again received within the wait time held in the wait time holding means; and protocol control means for providing a control data transmission signal to the transmission means when the time counting means does not provide the broken control data report signal.

the transmission means generating and transmitting the control data if receiving the control data transmission signal from protocol control means.

12. A token ring local area network comprising:

a plurality of data systems in which information is processed respectively;

a plurality of communication control devices provided at respective nodes of said network through which said data systems exchange information with each other;

means for detecting the number of said data systems which are actually operating in to said network for communication;

means for calculating a wait time, within which a succeeding token can be expected to be received at one of said communication control devices after reception of a preceding token, in accordance with the number of said data systems actually connected to said network, wherein the token is regenerated on said network if the token is not received within the wait time by a node.

13. The network of claim 12, wherein said detecting means is incorporated in each communication control device.

14. The network of claim 12, wherein said detecting means is incorporated in one of said communication control devices.

15. The network of claim 12, wherein said detecting means repeatedly transmits a first signal from one node and a second signal from every node which receives said first or second signal from a preceding node and is connected to one of said data systems actually connected to said network for communication, and the number of said data systems actually connected to said network for communication is determined by counting the number of said first and second signals between adjacent first signals.

16. The network of claim 12, wherein said calculating means is incorporated in each communication control device.

17. The network of claim 12, wherein said calculating means is incorporated in one of said communication control devices.

18. The network of claim 12, wherein said calculating means calculates said wait time by multiplying the number of said data systems actually connected to said network for communication by a token holding time during which one node can hold the token.

* * * * *